Patented Dec. 7, 1937

2,101,227

UNITED STATES PATENT OFFICE 2,101,227

POLYCARBOXYLIC ACID ESTERS OF POLY-UNSATURATED HIGHER ALCOHOLS

James H. Werntz, Wilmington, Del., assignor to E. I. du Pont de Nemours & Company, Wilmington, Del., a corporation of Delaware No Drawing. Application August 13, 1935, Serial No. 35,972

13 Claims. (Cl. 260—103)

This invention relates to new compositions of matter, and more particularly to polycarboxylic acid esters of long chain alcohols having two or more ethylenic double bonds. A particularly preferred class coming within the broad class is that of the polycarboxylic acid esters of monohydric alcohols obtainable from drying oils by reduction of the ester group thereof to a carbinol group.

This invention has an object the preparation of polycarboxylic acid esters of long chain polyunsaturated monohydric alcohols. A further object is the provision of a process for the manufacture of this class of esters. A further object is the preparation of cellulose derivative compositions employing these esters. Other objects will appear hereinafter.

These objects are accomplished by the following invention wherein a polycarboxylic acid, its anhydride, halide, or ester with a relatively volatile alcohol is reacted with a long chain polyunsaturated monohydric alcohol or monohydric aliphatic alcohol mixture comprising the same, or wherein the sodium salt of the acid is reacted with a chloride or other inorganic acid ester of the unsaturated alcohol or monohydric aliphatic alcohol mixture comprising the same.

Alcohols particularly suited to the practice of this invention are those obtained from drying oils, especially China-wood oil, by reduction of the ester group thereof to a carbinol group. This latter reduction may be accomplished in one way by means of sodium in the presence of an alcohol.

A particularly efficacious process whereby the sodium reduction is effected is disclosed in Scott and Hansley application Serial No. 729,900, filed June 9, 1934 which has issued as U. S. Patent No. 2,019,022. In this process the drying oil is dissolved in a sufficient amount (2½ to 10 times the weight of the oil) of a suitable inert solvent such as xylene, toluene, or petroleum fractions high in paraffin hydrocarbons and boiling up to 100° or even 130° C. A suitable alcohol such as methyl, ethyl, n-butyl, or preferably isopropyl, tert-butyl, or sec-butyl alcohol is added in amount equal to 2 mols alcohol per ester equivalent of the oil, i. e., 6 mols alcohol per mol. of glyceride. This alcohol-glyceride solution is then added slowly, with rapid agitation, to a suspension of finely divided alkali metal, such as sodium, in an inert solvent such as toluene, the reaction mixture being maintained at the desired reaction temperature, preferably one above the melting point of the alkali metal, e. g. 100°–110° C. when sodium is used. With highly unsaturated glycerides of the China-wood oil type a ratio of ester group to sodium to alcohol of 1:6:4 is used, corresponding to 1 mol. glyceride, 18 atoms of sodium, and 12 mols of alcohol. The alcohol mixture obtained in this way from China-wood oil is a water-white viscous oil having an iodine number of 166, a refractive index of 1.4734, and a specific gravity of 0.8590. This product is referred to hereinafter as China-wood oil alcohol. This alcohol has also been termed isodihydroeleostearyl alcohol by Kawai J. Chem. Soc. Japan 49 227–34 (1928) Chem. Abstracts 24 63 (1930). In view of the iodine number 166 which corresponds to that of an octadecadienol, it is probable that, in the sodium reduction of China-wood oil, a partial saturation of the double bonds takes place. The China-wood oil alcohol however still contains two or more ethylenic double bonds, which feature characterizes all the alcohols employed herein.

Having outlined above the general principles and purposes of the invention it may be stated in amplification that simple or mixed esters of the polyunsaturated long chain alcohols with polycarboxylic acids may be made in various ways of which the following examples are illustrative but not limitative:

*Example 1.—The diphthalate of China-wood oil alcohol*

One hundred six parts by weight of China-wood oil alcohol, 38.8 parts by weight of dimethyl phthalate, 4.5 parts by weight of litharge and 150 parts by weight of toluene were heated under a suitable fractionating column until the distilling temperature was constant at 108° C. The solution was filtered and the filtrate steam distilled. The aqueous suspension was saturated with salt, extracted with ether and the ether solution dried with sodium sulfate. After filtering and evaporating the ether a light orange colored liquid was obtained. The ester had a saponification number of 171.5, the theoretical value for the diester being 170.

*Example 2.—Acid phthalic ester of China-wood oil alcohol*

Two hundred sixty-five parts by weight of China-wood oil alcohol was heated with 148 parts by weight of phthalic anhydride for one and one-half hours at 140° C. The acid number was 143, the calculated value for the half ester being 135. The sodium salt of this ester is soluble in water and exerts a cleansing action when rubbed on the hands.

**Example 3.—*Maleate of China-wood oil alcohol***

Two hundred sixty-five parts by weight of China-wood oil alcohol, 147 parts by weight of maleic anhydride, and 50 parts by weight of benzene were heated on the steam bath under a reflux condenser for three hours. The benzene solution was washed with water and the benzene evaporated. When chilled in ice water, the clear oil became crystalline. The acid number of the product was 155.

**Example 4.—*Tri-ester of citric acid with China wood oil alcohol***

Seventy-nine and five-tenths parts by weight of China-wood oil alcohol, 27.6 parts by weight of triethyl citrate, 100 cc of toluene and 3 parts by weight of litharge were heated under a 4-foot fractionating column until the distilling temperature was constant at 108° C. This required 2 hours. The product was filtered, washed with water and the toluene removed by heating under vacuum. The light yellow liquid product had a saponification number of 166, the calculated value for the tri-ester being 180.

Ten parts by weight of this ester and 2 parts by weight of a 1% benzene solution of cobalt linoleate were mixed together and spread out in a thin film. After 24 hours exposure to the air the film had hardened to a tough coating. This is a property not shared by corresponding esters of alcohols having a lower degree of unsaturation.

**Example 5.—*Neutral phthalate of a mixture of stearyl alcohol and China-wood oil alcohol***

Fifty-three parts by weight of China wood oil alcohol, 54 parts by weight of octadecanol-1, 38.8 parts by weight of dimethyl phthalate, 4.5 parts by weight of litharge and 150 parts by weight of toluene were heated under a suitable fractionating column until the distilling temperature was constant at 108° C. The solution was filtered and the filtrate steam distilled. The aqueous suspension was saturated with salt, extracted with ether and the ether solution dried with sodium sulfate. After filtering and evaporating the ether a light colored low melting solid was obtained. The product was probably a mixture of octadecanol-China-wood oil alcohol phthalate with smaller amounts of octadecanal phthalate and China wood oil alcohol phthalate.

The above processes are generally applicable to the preparation of and the invention is generic to polycarboxylic acid esters of long chain polyunsaturated alcohols, i. e., alcohols of at least about 15 carbon atoms and having at least two unsaturated ethylenic bonds, i. e., two foci of unsaturation, including such alcohols as linolyl, linoleyl, alpha- and beta- eleostearyl, pentadecadienyl, octadecatrienyl, hexadecadienyl and the like. Those alcohols corresponding in chain length to the acids which are major constituents of drying and semi-drying oils (the alcohol differing from the acid in having a carbinol group in place of the carboxyl group) are a particularly preferred class of alcohols and are obtainable by the carboxyl reduction of polyunsaturated fatty acid radicals occuring to a substantial amount, that is, at least 10%, in drying and semi-drying oils. They include therefore the polyunsaturated alcohols obtained by the carboxylic reduction of drying oils or drying oil acids such as linseed oil, China-wood oil, perilla oil, soya bean oil, and the fatty acids derived from their saponification, such as linolic acid, eleostearic acid, linolenic acid, etc. Further, the esters of the present invention include those of polyunsaturated alcohols obtainable by sodium reduction of marine animal oils which are rich in the glycerides of highly unsaturated acids, examples of such oils being herring oil, sardine oil, and shark oil.

While certain acids have been given in illustration, the process is generally applicable to polycarboxylic acids, further examples of which are adipic, fumaric, maleic, succinic, malic, itaconic, glutaric, tricarballylic, azelaic, pimelic, trimesic, sebacic, suberic, quinolinic, diphenic, naphthalic, citric, hexahydrophthalic, tetrahydrophthalic, malonic, mucic, citraconic, trimellitic, tartaric, etc. acids. Ester compositions comprising these polycarboxylic acid esters may also include monocarboxylic acids and there may therefore also be employed abietic acid, propionic acid, benzoic acid, salicylic acid, naphthenic acids, lactic acid, oleic acid, linoleic acid, eleostearic acid, chloroacetic acid, ricinoleic acid, etc.

The methods for the preparation of the esters described above are capable of considerable variation. The constituents of the reaction mixture may be varied. Catalysts other than those mentioned may be used, or solvents may be used without the use of any catalyst.

The polycarboxylic acid esters of unsaturated alcohols mentioned herein include esters in which at least one of the alcohol groups is polyunsaturated, part or all of the remaining acid radicals of the acids being either unesterified or esterified with saturated or unsaturated alcohols. Mixed esters containing in addition to the polyunsaturated alcohol radicals, other alcohol radicals such as those of methyl, ethyl, butyl, octyl, dodecyl, hexadecyl, 9, 10-octadecenyl, octadecyl, cyclohexyl, benzyl, ethoxyethyl, etc. alcohols may also be prepared according to the disclosure of this specification, for example by reacting a mixture of alcohols comprising a polyunsaturated alcohol and an alcohol having less than two double bonds with the acid or acid anhydride in the presence of a catalyst such as hydrochloric or, preferably, sulfuric acid, or by reaction of the mixture of the two types of alcohols with a polycarboxylic acid ester of an alcohol more volatile than either.

The esters prepared as above described vary from waterwhite to pale amber liquids or low melting solids. They are insoluble in water but are readily soluble in alcohol, acetone, ethyl acetate, butyl acetate, benzene, xylene, ether, etc. They are compatible when mixed in equal proportions with nitrocellulose and are compatible in lower ratios with cellulose ethers and other cellulose esters. These new esters are therefore valuable in the manufacture of coating and plastic compositions containing cellulose derivatives. Films containing mixtures of these derivatives, particularly those from mixtures of saturated and polyunsaturated alcohols, with cellulose derivatives are tough and flexible. These plasticizers are high boiling and therefore impart substantially permanent flexibility to films in which they are used.

In addition to their use in coating and plastic compositions the esters disclosed herein are valuable for the preparation of all types of compositions containing cellulose esters and ethers. In particular they may be used in the preparation of lacquers for coating metal and wood, in dopes for coating fabrics, paper, etc., and in plastic compositions to be used in the preparation of toiletware, novelties, sheeting, rods, tubes, safety glass, etc. They may also be used in cellulose derivative adhesive compositions.

The esters of this invention show a pronounced tendency toward auto-oxidation, particularly in the presence of catalysts such as cobalt linoleate, to form hard films. This behavior is especially noticeable when the esters are made with carboxylic acids of three or more acid groups such as the citrate esters. The use of the sulfated or sulfonated esters as wetting agents and detergents is disclosed in Werntz application Serial No. 757,465, filed December 14, 1934, of which the present application is a continuation in part.

The above description and specific examples are given for illustration only. Any modification of or variation therefrom which conforms to the spirit of the invention is intended to be included within the scope of the claims.

I claim:

1. An ester of a polycarboxylic acid wherein the hydrogen atom of at least one carboxyl group is replaced by the polyunsaturated hydrocarbon radical of an alcohol obtainable by the carboxyl reduction of the acid radicals of China-wood oil.

2. An ester of a polycarboxylic acid wherein the hydrogen atoms of the carboxyl groups are replaced by the polyunsaturated hydrocarbon radical of an alcohol obtainable by the carboxyl reduction of the acid radicals of China-wood oil.

3. An ester of a polycarboxylic acid wherein the hydrogen atom of at least one carboxyl group is replaced by the polyunsaturated hydrocarbon radical of an alcohol obtainable by the carboxyl reduction of the acid radicals of a drying oil.

4. An ester of a polycarboxylic acid wherein the hydrogen atoms of the carboxyl groups are replaced by the polyunsaturated hydrocarbon radical of an alcohol obtainable by the carboxyl reduction of the acid radicals of a drying oil.

5. An ester of a polycarboxylic acid wherein the hydrogen atom of at least one carboxyl group is replaced by the polyunsaturated hydrocarbon radical of an alcohol obtainable by the carboxyl reduction of the acid radicals of a drying oil, and the hydrogen atom of another carboxyl group is replaced by the radical of a different alcohol.

6. An acid ester of a polycarboxylic acid wherein the hydrogen atom of at least one carboxyl group is replaced by the polyunsaturated hydrocarbon radical of an alcohol obtainable by the carboxyl reduction of the acid radicals of China-wood oil.

7. A polycarboxylic acid ester of a polyunsaturated monohydric alcohol of at least 15 carbon atoms.

8. Process for the preparation of a polycarboxylic acid ester of a polyunsaturated long chain alcohol, which comprises reacting said alcohol with a member of the class consisting of polycarboxylic acids, their anhydrides, their acid halides, and their esters with more volatile alcohols.

9. A citric acid ester of a polyunsaturated long chain alcohol obtainable by the sodium reduction of China-wood oil.

10. A phthalic acid ester of a polyunsaturated long chain alcohol obtainable by the sodium reduction of China-wood oil.

11. A neutral phthalic acid ester of a polyunsaturated long chain alcohol obtainable by the sodium reduction of China-wood oil.

12. An ester composition obtained by esterifying a polycarboxylic acid with a mixture of aliphatic monohydric alcohols containing in predominant amount a polyunsaturated monohydric alcohol of at least 15 carbon atoms.

13. An ester composition obtainable by esterifying a polycarboxylic acid with the mixture of polyunsaturated alcohols obtainable by the carboxyl reduction of China-wood oil.

JAMES H. WERNTZ.

---

CERTIFICATE OF CORRECTION.

Patent No. 2,101,227.  December 7, 1937.

JAMES H. WERNTZ.

It is hereby certified that error appears in the printed specification of the above numbered patent requiring correction as follows: Page 2, first column, line 51, for the word "octadecanal" read octadecanol; and that the said Letters Patent should be read with this correction therein that the same may conform to the record of the case in the Patent Office.

Signed and sealed this 15th day of February, A. D. 1938.

(Seal)

Henry Van Arsdale,
Acting Commissioner of Patents of lacquers for coating metal and wood, in dopes for coating fabrics, paper, etc., and in plastic compositions to be used in the preparation of toiletware, novelties, sheeting, rods, tubes, safety glass, etc. They may also be used in cellulose derivative adhesive compositions.

The esters of this invention show a pronounced tendency toward auto-oxidation, particularly in the presence of catalysts such as cobalt linoleate, to form hard films. This behavior is especially noticeable when the esters are made with carboxylic acids of three or more acid groups such as the citrate esters. The use of the sulfated or sulfonated esters as wetting agents and detergents is disclosed in Werntz application Serial No. 757,465, filed December 14, 1934, of which the present application is a continuation in part.

The above description and specific examples are given for illustration only. Any modification of or variation therefrom which conforms to the spirit of the invention is intended to be included within the scope of the claims.

I claim:

1. An ester of a polycarboxylic acid wherein the hydrogen atom of at least one carboxyl group is replaced by the polyunsaturated hydrocarbon radical of an alcohol obtainable by the carboxyl reduction of the acid radicals of China-wood oil.

2. An ester of a polycarboxylic acid wherein the hydrogen atoms of the carboxyl groups are replaced by the polyunsaturated hydrocarbon radical of an alcohol obtainable by the carboxyl reduction of the acid radicals of China-wood oil.

3. An ester of a polycarboxylic acid wherein the hydrogen atom of at least one carboxyl group is replaced by the polyunsaturated hydrocarbon radical of an alcohol obtainable by the carboxyl reduction of the acid radicals of a drying oil.

4. An ester of a polycarboxylic acid wherein the hydrogen atoms of the carboxyl groups are replaced by the polyunsaturated hydrocarbon radical of an alcohol obtainable by the carboxyl reduction of the acid radicals of a drying oil.

5. An ester of a polycarboxylic acid wherein the hydrogen atom of at least one carboxyl group is replaced by the polyunsaturated hydrocarbon radical of an alcohol obtainable by the carboxyl reduction of the acid radicals of a drying oil, and the hydrogen atom of another carboxyl group is replaced by the radical of a different alcohol.

6. An acid ester of a polycarboxylic acid wherein the hydrogen atom of at least one carboxyl group is replaced by the polyunsaturated hydrocarbon radical of an alcohol obtainable by the carboxyl reduction of the acid radicals of China-wood oil.

7. A polycarboxylic acid ester of a polyunsaturated monohydric alcohol of at least 15 carbon atoms.

8. Process for the preparation of a polycarboxylic acid ester of a polyunsaturated long chain alcohol, which comprises reacting said alcohol with a member of the class consisting of polycarboxylic acids, their anhydrides, their acid halides, and their esters with more volatile alcohols.

9. A citric acid ester of a polyunsaturated long chain alcohol obtainable by the sodium reduction of China-wood oil.

10. A phthalic acid ester of a polyunsaturated long chain alcohol obtainable by the sodium reduction of China-wood oil.

11. A neutral phthalic acid ester of a polyunsaturated long chain alcohol obtainable by the sodium reduction of China-wood oil.

12. An ester composition obtained by esterifying a polycarboxylic acid with a mixture of aliphatic monohydric alcohols containing in predominant amount a polyunsaturated monohydric alcohol of at least 15 carbon atoms.

13. An ester composition obtainable by esterifying a polycarboxylic acid with the mixture of polyunsaturated alcohols obtainable by the carboxyl reduction of China-wood oil.

JAMES H. WERNTZ.

CERTIFICATE OF CORRECTION.

Patent No. 2,101,227.            December 7, 1937.

JAMES H. WERNTZ.

It is hereby certified that error appears in the printed specification of the above numbered patent requiring correction as follows: Page 2, first column, line 51, for the word "octadecanal" read octadecanol; and that the said Letters Patent should be read with this correction therein that the same may conform to the record of the case in the Patent Office.

Signed and sealed this 15th day of February, A. D. 1938.

(Seal)

Henry Van Arsdale,
Acting Commissioner of Patents

CERTIFICATE OF CORRECTION.

Patent No. 2,101,227.   December 7, 1937.

JAMES H. WERNTZ.

It is hereby certified that error appears in the printed specification of the above numbered patent requiring correction as follows: Page 2, first column, line 51, for the word "octadecanal" read octadecanol; and that the said Letters Patent should be read with this correction therein that the same may conform to the record of the case in the Patent Office.

Signed and sealed this 15th day of February, A. D. 1938.

(Seal)

Henry Van Arsdale,
Acting Commissioner of Patents